US012617116B2

(12) United States Patent
Vivona, Jr. et al.

(10) Patent No.: US 12,617,116 B2
(45) Date of Patent: May 5, 2026

(54) TABLE SAW INCLUDING STORAGE MOUNT FOR BLADE GUARD ASSEMBLY

(71) Applicant: TECHTRONIC CORDLESS GP, Anderson, SC (US)

(72) Inventors: David A. Vivona, Jr., Easley, SC (US); Andrew Kinnison, Simpsonville, SC (US); Zachary Hill Lowe, Greenville, SC (US); Pearson T. Riggs, Simpsonville, SC (US); M. Grayson Jacoway, Mauldin, SC (US)

(73) Assignee: Techtronic Cordless GP, Anderson, SC (US)

( * ) Notice: Subject to any disclaimer, the term of this patent is extended or adjusted under 35 U.S.C. 154(b) by 333 days.

(21) Appl. No.: 18/361,435

(22) Filed: Jul. 28, 2023

(65) Prior Publication Data

US 2024/0051173 A1 Feb. 15, 2024

Related U.S. Application Data

(60) Provisional application No. 63/396,823, filed on Aug. 10, 2022.

(51) Int. Cl.
*B27B 5/22* (2006.01)
*B27B 5/24* (2006.01)
*B27G 19/02* (2006.01)

(52) U.S. Cl.
CPC .............. *B27B 5/222* (2013.01); *B27B 5/243* (2013.01); *B27G 19/02* (2013.01)

(58) Field of Classification Search
CPC .......... B27B 5/222; B27B 5/243; B27G 19/02
See application file for complete search history.

(56) References Cited

U.S. PATENT DOCUMENTS

| | | | | |
|---|---|---|---|---|
| 2,637,353 | A | 5/1953 | Hyslop, Jr. | |
| 6,986,370 | B1 | 1/2006 | Schoene et al. | |
| 8,616,104 | B2 * | 12/2013 | Frolov | B23D 47/02 83/477.2 |
| 9,505,069 | B2 | 11/2016 | Frolov | |
| 10,092,968 | B2 * | 10/2018 | Fulmer | B23D 45/06 |
| 10,688,572 | B2 | 6/2020 | Fulmer et al. | |

(Continued)

FOREIGN PATENT DOCUMENTS

| | | | |
|---|---|---|---|
| CN | 214644358 | U | 11/2021 |
| DE | 2950104 | A1 | 6/1981 |

(Continued)

*Primary Examiner* — Omar Flores Sanchez
(74) *Attorney, Agent, or Firm* — Michael Best & Friedrich LLP

(57) ABSTRACT

A table saw including a table, a saw unit, a storage mount bracket, and a blade guard assembly. The saw unit includes a saw blade and a riving knife. The saw blade is extendable through a slot in the table. The riving knife is positioned behind the saw blade and has a first mating interface. The storage mount bracket has a second mating interface complimentary to the first mating interface. The blade guard assembly is attachable to the first mating interface of the riving knife to cover at least a portion of the saw blade. The blade guard assembly is additionally attachable with the second mating interface to attach the blade guard assembly to the storage mount bracket when the blade guard assembly is removed from the riving knife.

20 Claims, 13 Drawing Sheets

(56) References Cited

U.S. PATENT DOCUMENTS

| | | | | |
|---|---|---|---|---|
| 2004/0187666 | A1* | 9/2004 | Huang | B23D 47/025 83/477.2 |
| 2006/0096428 | A1* | 5/2006 | Garcia | B27G 19/08 83/477.2 |
| 2007/0186741 | A1* | 8/2007 | Buck | B27G 19/02 83/438 |
| 2010/0024620 | A1* | 2/2010 | Arvey | B27G 19/02 83/397 |
| 2012/0006170 | A1* | 1/2012 | Frolov | B27B 5/243 83/477.1 |
| 2015/0343662 | A1* | 12/2015 | Aiken | B27G 19/08 83/102.1 |
| 2016/0067800 | A1* | 3/2016 | Frolov | B23D 57/0092 83/477.2 |
| 2016/0332244 | A1* | 11/2016 | Koegel | B23Q 17/2419 |
| 2020/0376574 | A1 | 12/2020 | Fulmer et al. | |
| 2021/0387374 | A1* | 12/2021 | Kovács | B27G 19/02 |

FOREIGN PATENT DOCUMENTS

| | | | |
|---|---|---|---|
| EP | 3715073 | A1 | 9/2020 |
| WO | 2016089973 | A1 | 6/2016 |

* cited by examiner

TABLE SAW INCLUDING STORAGE MOUNT FOR BLADE GUARD ASSEMBLY

CROSS-REFERENCE TO RELATED APPLICATION

This application claims priority to U.S. Provisional Patent Application No. 63/396,823 filed on Aug. 10, 2022, the entire content of which is incorporated herein by reference.

FIELD OF THE DISCLOSURE

The present disclosure relates to power tools, and more specifically, to table saws.

BACKGROUND OF THE DISCLOSURE

Table saws typically include a table, a saw blade extending through a slot within the table, and a removable blade guard assembly for shrouding the saw blade when the table saw is not in use. Depending upon the height of the workpiece being cut with the table saw, it might be desirable to temporarily remove the blade guard assembly from the table to expose the entire height of the saw blade.

SUMMARY OF THE DISCLOSURE

In one aspect, the disclosure provides a table saw including a table, a saw unit, a storage mount bracket, and a blade guard assembly. The saw unit includes a saw blade and a riving knife. The saw blade is extendable through a slot in the table. The riving knife is positioned behind the saw blade and has a first mating interface. The storage mount bracket has a second mating interface complimentary to the first mating interface. The blade guard assembly is attachable to the first mating interface of the riving knife to cover at least a portion of the saw blade. The blade guard assembly is additionally attachable with the second mating interface to attach the blade guard assembly to the storage mount bracket when the blade guard assembly is removed from the riving knife.

In another aspect, the disclosure provides a table saw including a table, a saw unit, a storage mount bracket, and a blade guard assembly. The saw unit includes a saw blade and a riving knife. The saw blade extends through a slot in the table. The riving knife is positioned behind the saw blade. The saw unit is pivotable relative to the table to adjust a bevel angle of the saw blade. The storage mount bracket is coupled to the saw unit for movement therewith when the bevel angle of the saw blade is adjusted. The blade guard assembly is interchangeably coupled to the riving knife when in an operating position to cover at least a portion of the saw blade, and removably coupled to the storage mount bracket when in a storage position and detached from the riving knife.

In another aspect, the disclosure provides a table saw including a table, a saw unit, and a blade guard assembly. The saw unit includes a saw blade extendable through a slot in the table. The saw unit is pivotable relative to the table to adjust a bevel angle of the saw blade. The blade guard assembly is movable between a first position in which the blade guard assembly is removably coupled to the saw unit at a location above the table, and a second position in which the blade guard is removably coupled to the saw unit at a location below the table for storage.

Figure 1:
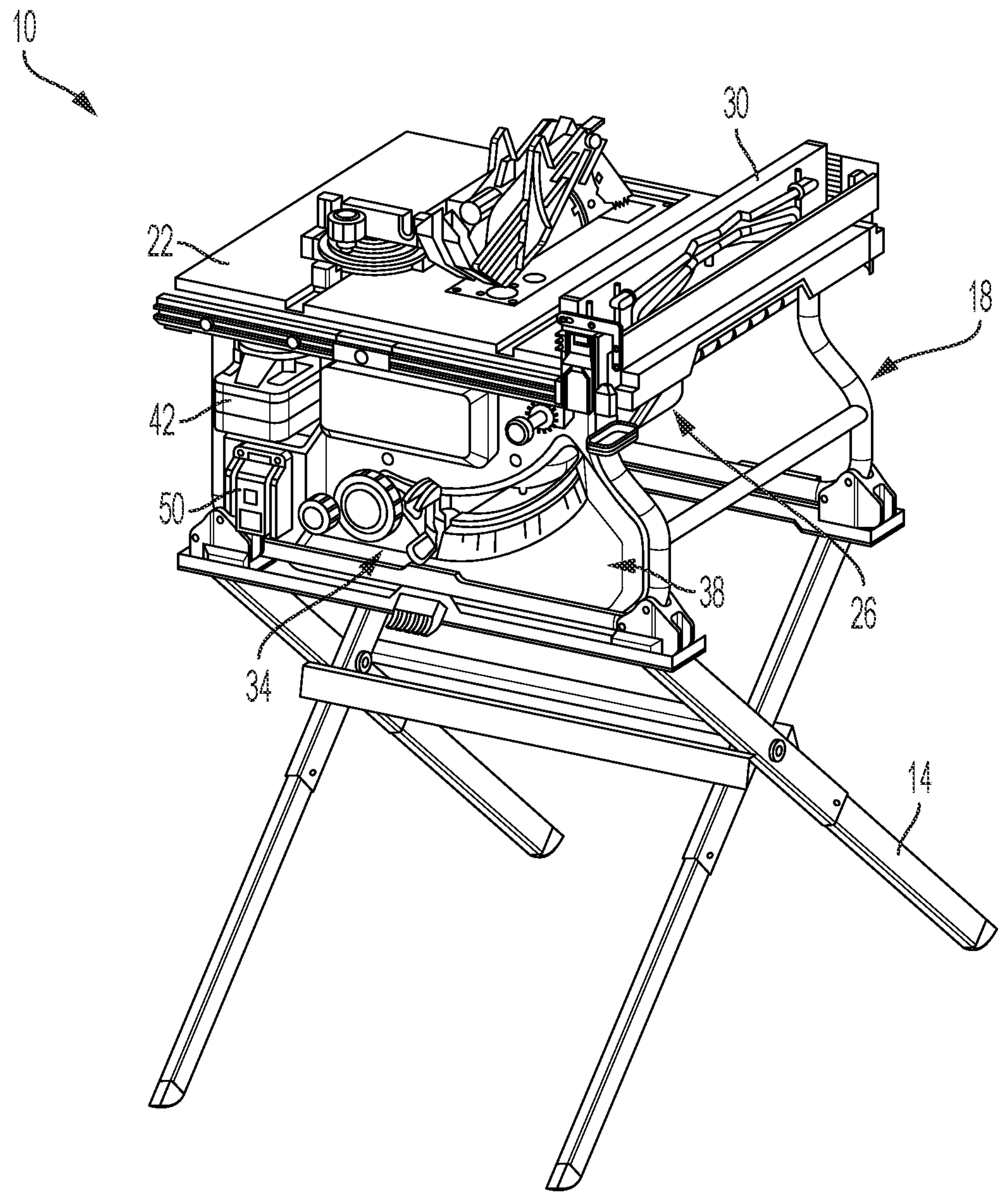
FIG. 1 is a front perspective view of a table saw having a blade guard assembly in an operating position.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms “first”, “second”, and “third” may be used interchangeably to distinguish one component from another and are not intended to signify location or importance of the individual components. The singular forms “a,” “an,” and “the” include plural references unless the context clearly dictates otherwise. The terms “coupled,” “fixed,” “attached to,” and the like refer to both direct coupling, fixing, or attaching, as well as indirect coupling, fixing, or attaching through one or more intermediate components or features, unless otherwise specified herein. As used herein, the terms “comprises,” “comprising,” “includes,” “including,” “has,” “having” or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, “or” refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

DETAILED DESCRIPTION

FIG. 1 illustrates a table saw 10 for supporting and cutting a workpiece. The table saw 10 includes a stand 14, a frame 18, and a table 22. The frame 18 and the table 22 are supported by the stand 14. The stand 14 is adjustable such that the height of the table 22 may be adjusted relative to a user. The stand 14 may be collapsed to improve ease of transport of the table saw 10.

Figure 2:
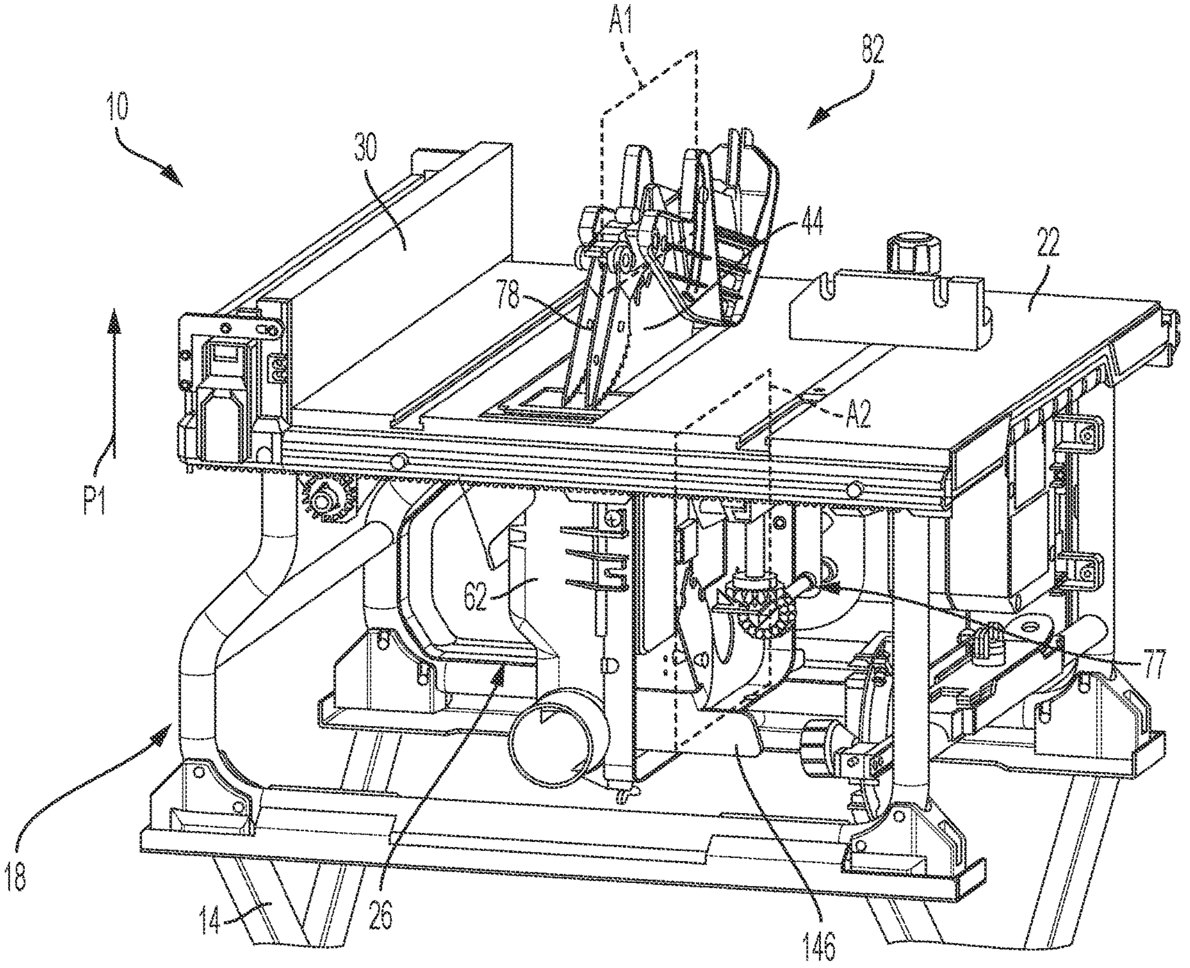
FIG. 2 is a rear perspective view of the table saw of FIG. 1.

With reference to FIGS. 1 and 2, the table saw 10 further includes a saw unit 26, a rip fence 30, a combined saw blade cutting depth/bevel angle adjustment mechanism 34, a user interface 38, and a battery pack 42. The rip fence 30 is positioned on the table 22 and may be used to guide a workpiece during a cutting operation. As further explained below, the adjustment mechanism 34 permits independent adjustment of the cutting depth and the bevel angle of a saw blade 44 relative to the table 22.

Figure 3:
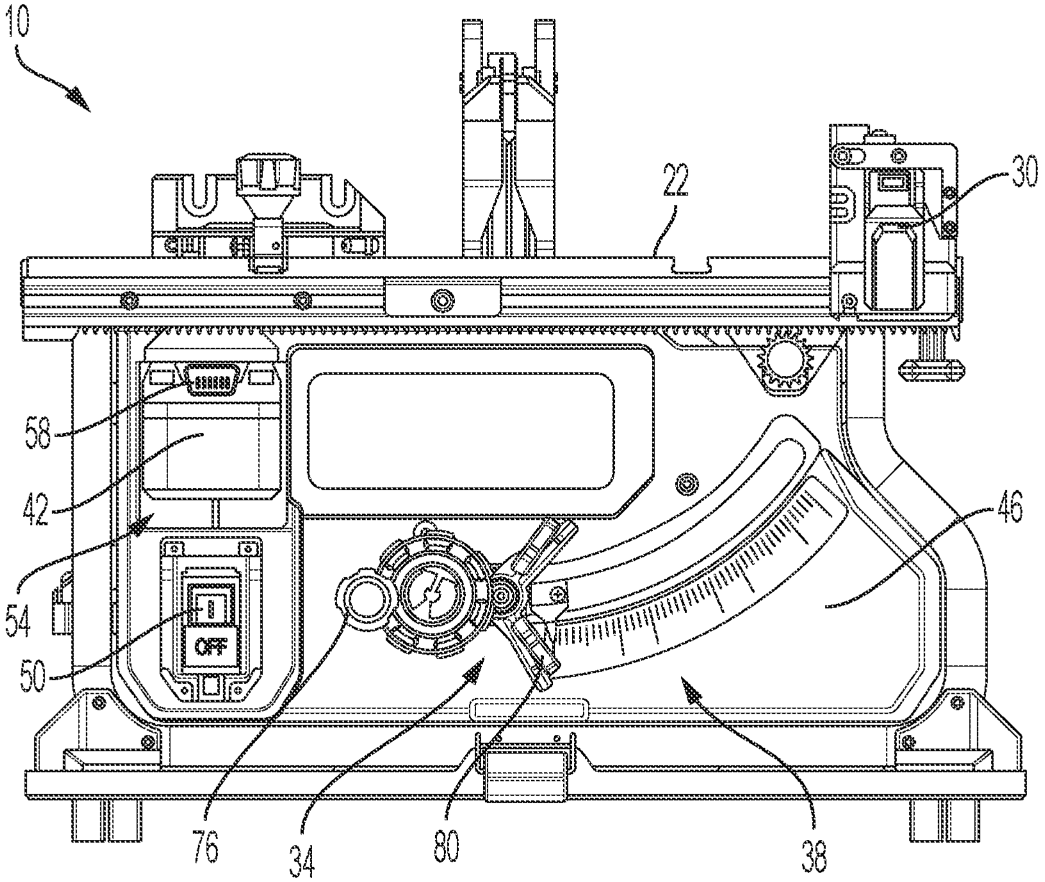
FIG. 3 is a front view of the table saw of FIG. 1.

As illustrated in FIG. 3, the user interface 38 and the battery pack 42 are positioned on a front panel 46 of the table saw 10. The user interface 38 includes a main power button 50 to activate and deactivate the saw unit 26 and a battery receptacle 54 in which the battery pack 42 is received. In some embodiments, the battery pack 42 includes an onboard battery charge indicator 58 that extends through the front panel 46. As such, the battery charge indicator 58 is visible to a user during operation of the table saw 10 and thus provides an indication of a charge level of the battery pack 42.

Figure 4:
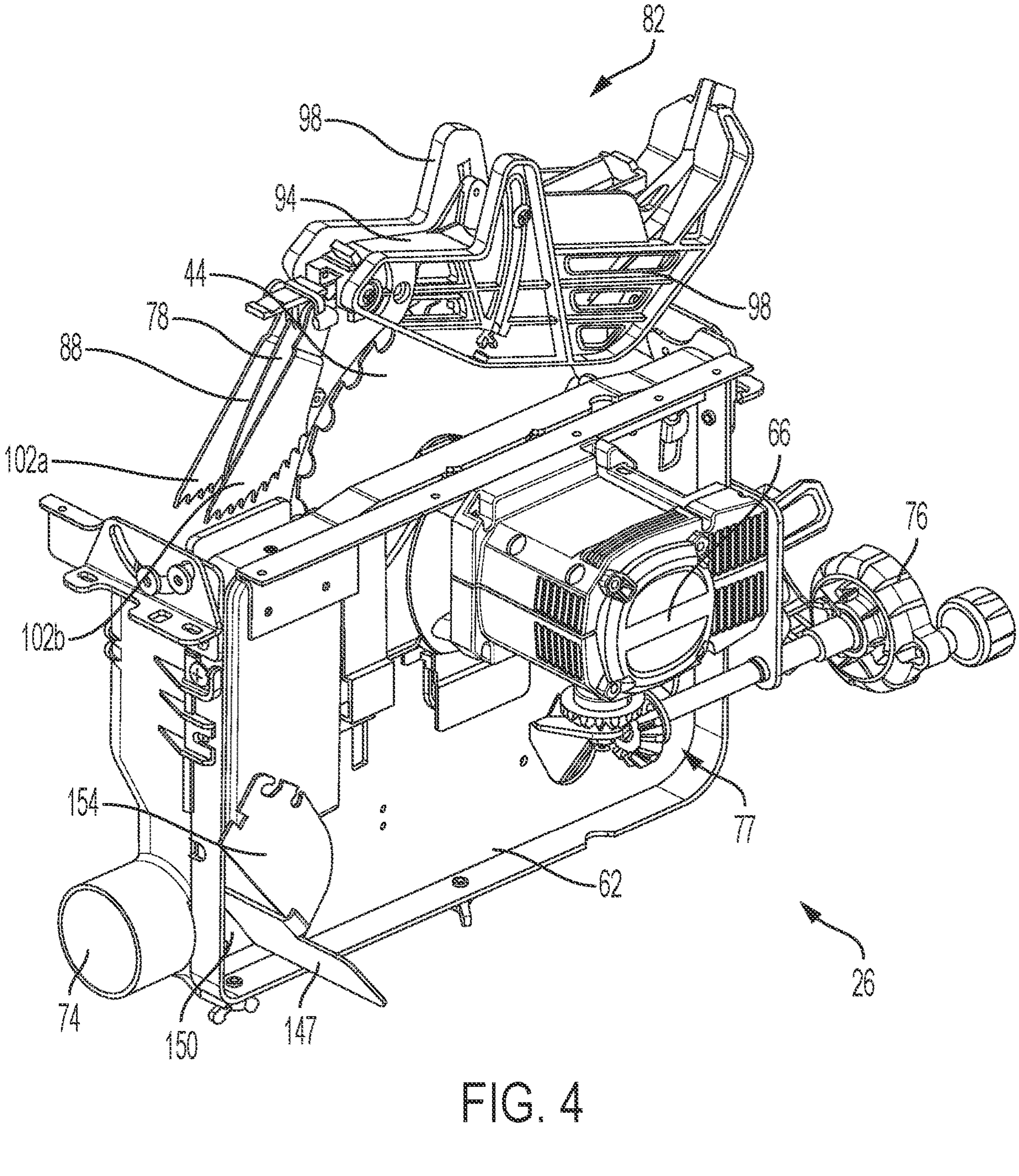
FIG. 4 is a perspective view of a saw unit of the table saw of FIG. 1.

The saw unit 26, as illustrated in FIG. 4, includes a dust shroud 62, a motor 66 coupled for movement with and relative to the dust shroud 62, and the saw blade 44, which extends from the top of the dust shroud 62 and through the table 22 (FIG. 2). The dust shroud 62 includes an outlet 74 that may fluidly connect to an external vacuum for inducing a flow of suctioning air through the dust shroud 62 or, in an alternative embodiment, an onboard dust container in which dust and other debris created during a cutting operation is captured. The motor 66 receives power from the battery pack 42 (FIG. 3) and drives rotation of the saw blade 44. In the illustrated embodiment, the saw blade 44 is a circular saw. A user may slide a workpiece along the table 22 (FIG. 2) to the saw blade 44 while the saw blade 44 is rotatably driven by the motor 66 to perform a cutting operation on the workpiece. Debris generated during the cutting operation may then be suctioned into the dust shroud 62 and through the outlet 74.

With reference to FIGS. 2 and 3, in the illustrated embodiment, the combined saw blade cutting depth/bevel angle adjustment mechanism 34 is operable to raise and lower the saw blade 44 relative to the table 22 and the dust shroud 62 of the saw unit 26. The adjustment mechanism 34 includes a crank 76 that drives a gear train 77, the output of which raises and lowers the motor 66 and saw blade 44 relative to the dust shroud 62 and the table 22 (i.e., in a vertical direction P1 perpendicular to the table 22). The adjustment mechanism 34 also includes a bevel angle lock 80, which is capable of locking the saw unit 26 to the front panel 46 in a selected bevel angle relative to the table 22.

Figure 5:
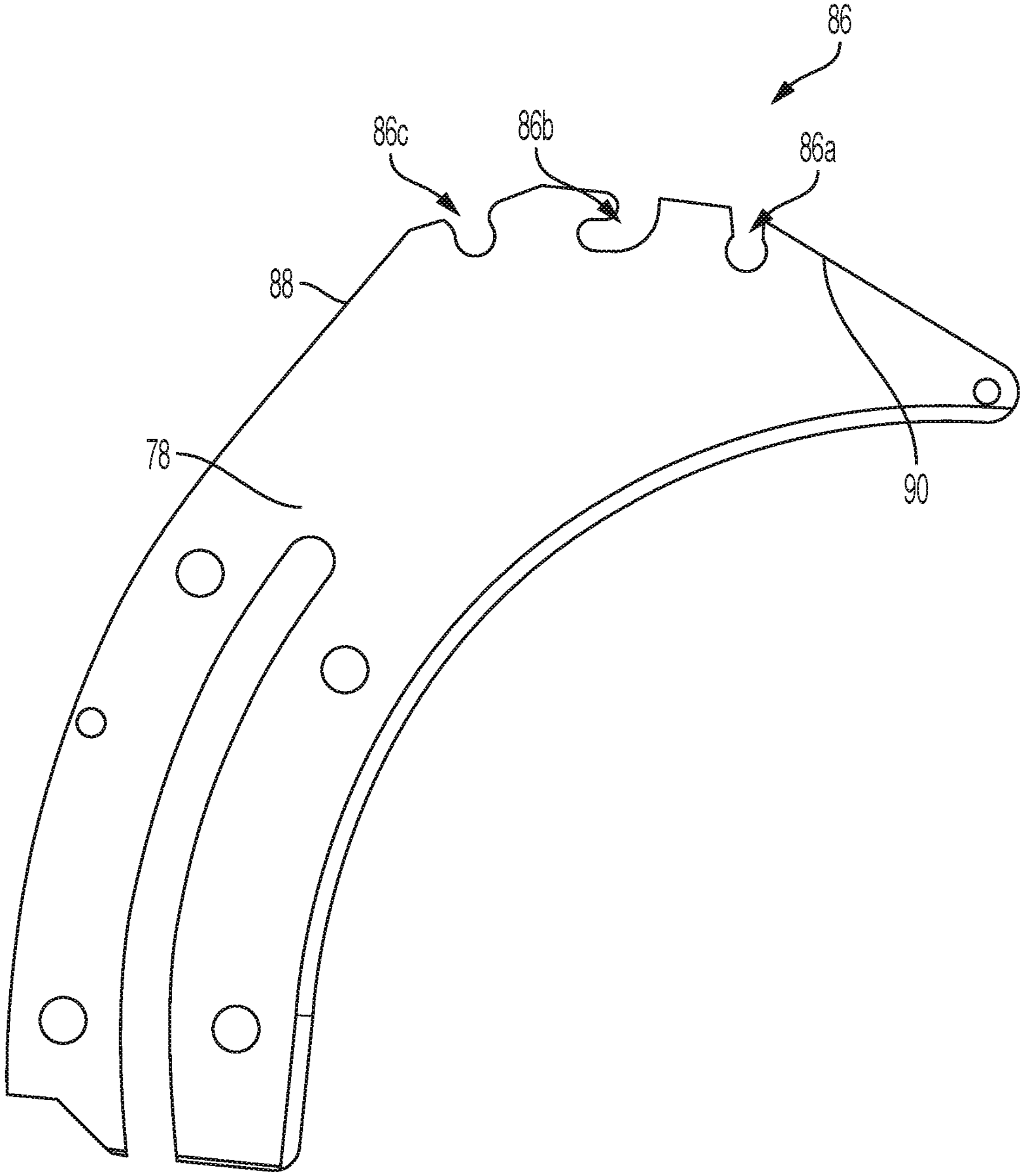
FIG. 5 is a front view of a riving knife of the saw unit of FIG. 4.

With reference to FIG. 4, the saw unit 26 includes a selectively removable riving knife 78. The riving knife 78 extends from the dust shroud 62 and through the table 22 (see also FIG. 2). The riving knife 78 is located downstream of the saw blade 44. In other words, the riving knife 78 is located on a side of the saw blade 44 opposite from a user. As illustrated in FIG. 5, the riving knife 78 includes a first mating interface 86 along a top edge 90 thereof. The first mating interface 86 includes a first slot 86*a*, a second slot 86*b*, and a third slot 86*c*. Each of the first slot 86*a* and the second slot 86*b* is formed along the top edge 90 of the riving knife 78, whereas the third slot 86*c* is formed proximate a junction of the top edge 90 and a rear edge 88 of the riving knife 78. The first slot 86*a* is substantially circular. The second slot 86*b* is elongated and curves roughly 90 degrees from the top edge 90 of the riving knife 78. The third slot 86*c* is also substantially circular.

Figure 6:
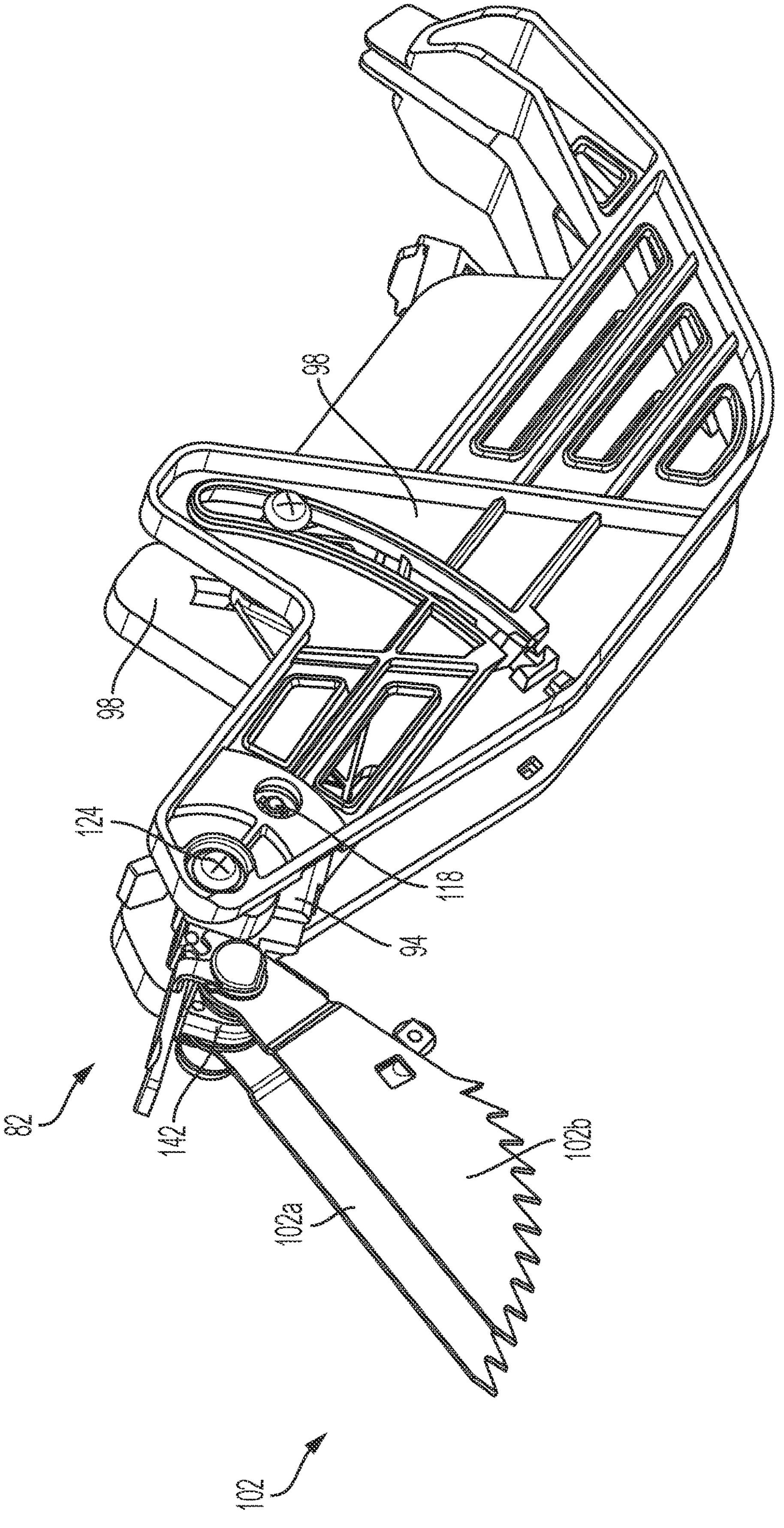
FIG. 6 is a perspective view of the blade guard assembly of FIG. 1.
Figure 11:
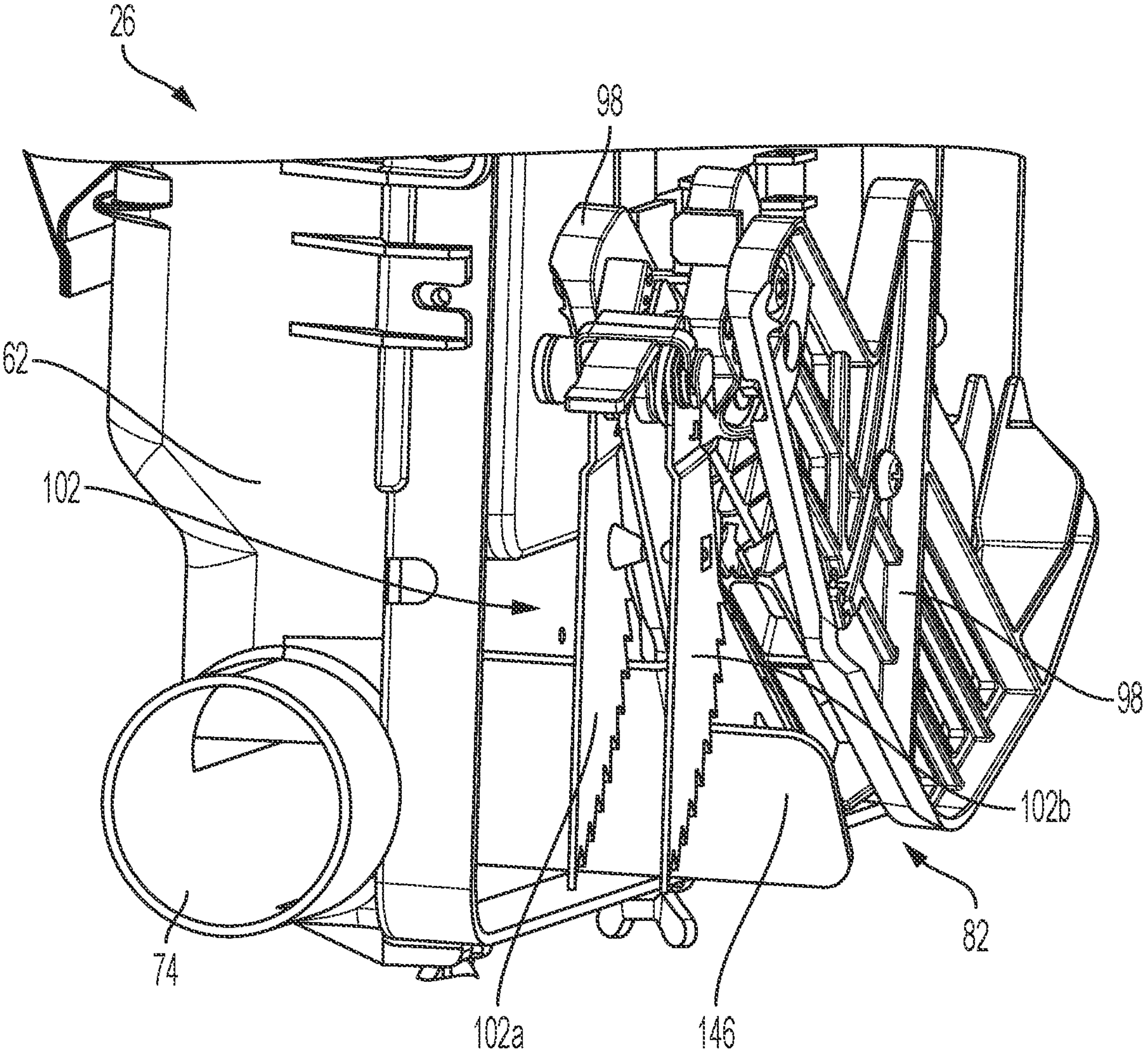
FIG. 11 is an enlarged, rear perspective view of a portion of the table saw of FIG. 1 with the blade guard assembly in a storage position.

As illustrated in FIG. 4, the table saw 10 further includes a blade guard assembly 82. With reference to FIG. 2, the blade guard assembly 82 may be placed in an operating position generally adjacent the saw blade 44. As illustrated in FIG. 11, the blade guard assembly 82 may alternatively be placed in a storage position within the frame 18 of the table saw 10. Returning reference to FIG. 4, in the operating position, the blade guard assembly 82 is mounted to the saw unit 26, and more specifically, to the riving knife 78, to inhibit a user from inadvertently touching the saw blade 44. As such, the blade guard assembly 82 generally surrounds the saw blade 44 in the operating position. As illustrated in FIG. 6, the blade guard assembly 82 includes an upper blade guard 94 and dual side blade guards 98, one positioned on each side of the upper blade guard 94 and pivotably coupled to the upper blade guard 94. In some embodiments, the table saw 10 also includes an anti-kickback pawl assembly 102 positioned behind the blade guard assembly 82 and attachable to the riving knife 78. During a cutting operation, the anti-kickback pawl assembly 102 prevents "kickback" of the workpiece towards the user.

Figure 7A:
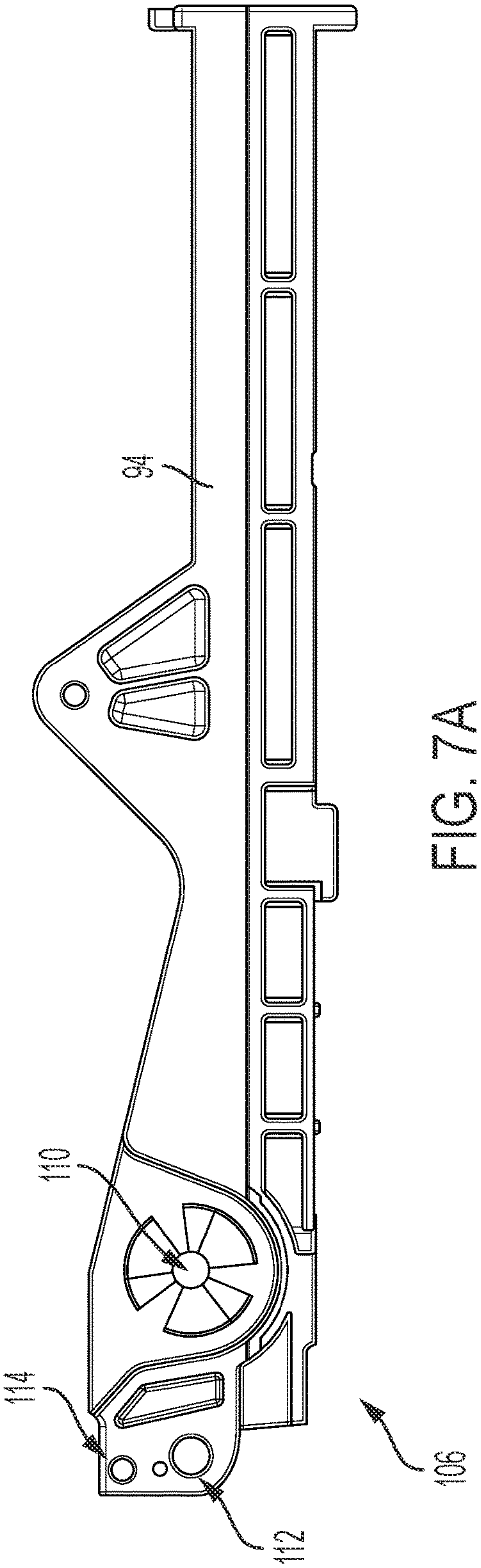
FIG. 7A is a front view of an upper blade guard of the blade guard assembly of FIG. 6.
Figure 7B:
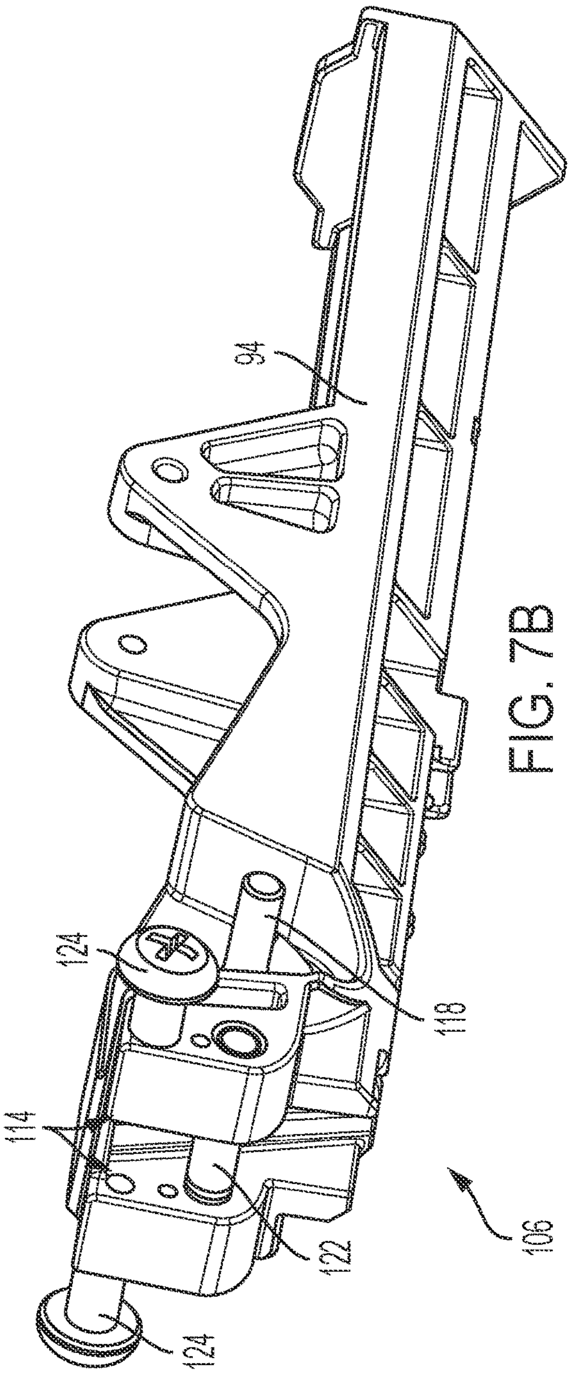
FIG. 7B is a perspective view of the upper blade guard of FIG. 7A.
Figure 8:
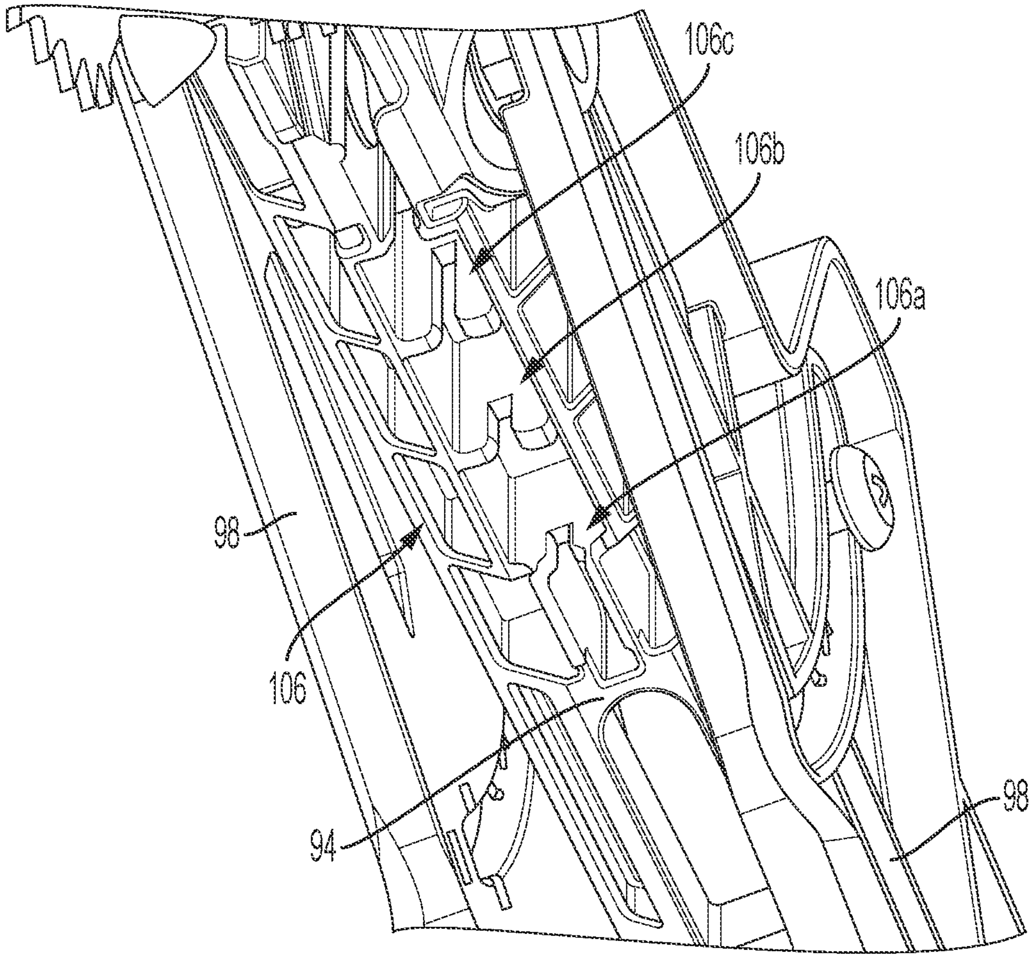
FIG. 8 is a bottom perspective view of a portion of the upper blade guard of FIG. 7A.

As illustrated in FIGS. 7A and 7B, the upper blade guard 94 includes a guard assembly mounting interface 106. The guard assembly mounting interface 106 includes a plurality of slots 106*a*-106*c* (e.g., as illustrated in FIG. 8) and a plurality of apertures 110, 112, 114. In the illustrated embodiment, turning reference to FIG. 8, the plurality of slots 106*a*-106*c* includes a first slot 106*a*, a second slot 106*b*, and a third slot 106*c*. The first slot 106*a* is smaller than the second slot 106*b* and the third slot 106*c*. The second slot 106*b* is smaller than the third slot 106*c*. The plurality of slots 106*a*-106*c* rest on an inclined portion of the top edge 90 of the riving knife 78 (FIG. 5). Returning reference to FIGS. 7A and 7B, the plurality of apertures 110, 112, 114 includes, in the illustrated embodiment, a first aperture 110, second apertures 112, and third apertures 114. The first aperture 110 receives a first pin 118 that is inserted into the first slot 86*a* of the riving knife 78 (FIG. 5) when the blade guard assembly 82 is mounted to the riving knife 78 in the operating position (FIG. 4). The second apertures 112 receive a second pin 122 that is inserted into the second slot 86*b* of the riving knife 78 (FIG. 5) when the blade guard assembly 82 is mounted to the riving knife 78 in the operating position (FIG. 4). In the illustrated embodiment, the upper blade guard 94 includes third apertures 114, which are threaded. Each of the threaded third apertures 114 receives a corresponding fastener 124 from each of the side blade guards 98 to couple the guards 98 to the upper blade guard 94 (FIGS. 6 and 7B).

Figure 9:
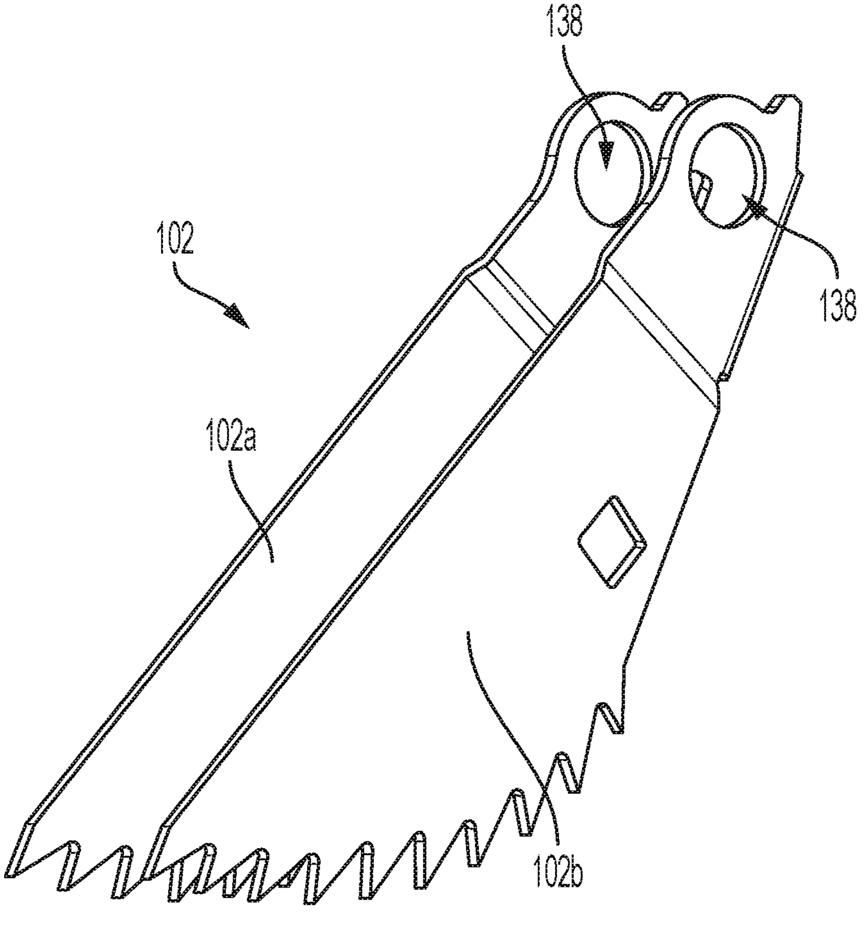
FIG. 9 is a perspective view of anti-kickback pawls of the blade guard assembly of FIG. 6.

Turning reference to FIGS. 6 and 9, the anti-kickback pawl assembly 102 includes two anti-kickback pawls 102*a*, 102*b* and may be independently and separately mounted to the riving knife 78 as the blade guard assembly 82. In an operating position of the anti-kickback pawl assembly 102, each of the anti-kickback pawls 102*a*, 102*b* is mounted to opposite sides of the riving knife 78 (FIG. 4). The anti-kickback pawls 102*a*, 102*b* include an aperture 138 that receives a quick release mechanism 142 that is inserted into the third slot 86*c* of the riving knife 78 (FIG. 5). The quick release mechanism 142 is spring biased and may include a button or an actuator that may allow a user to release the tension of the spring bias. In the illustrated embodiment, the quick release mechanism 142 does not extend through the upper blade guard 94 such that the anti-kickback pawls 102*a*, 102*b* are separate from the upper blade guard 94 and the side blade guards 98. In other embodiments, the anti-kickback pawl assembly 102 may be directly mounted to the upper blade guard 94.

Figure 10:
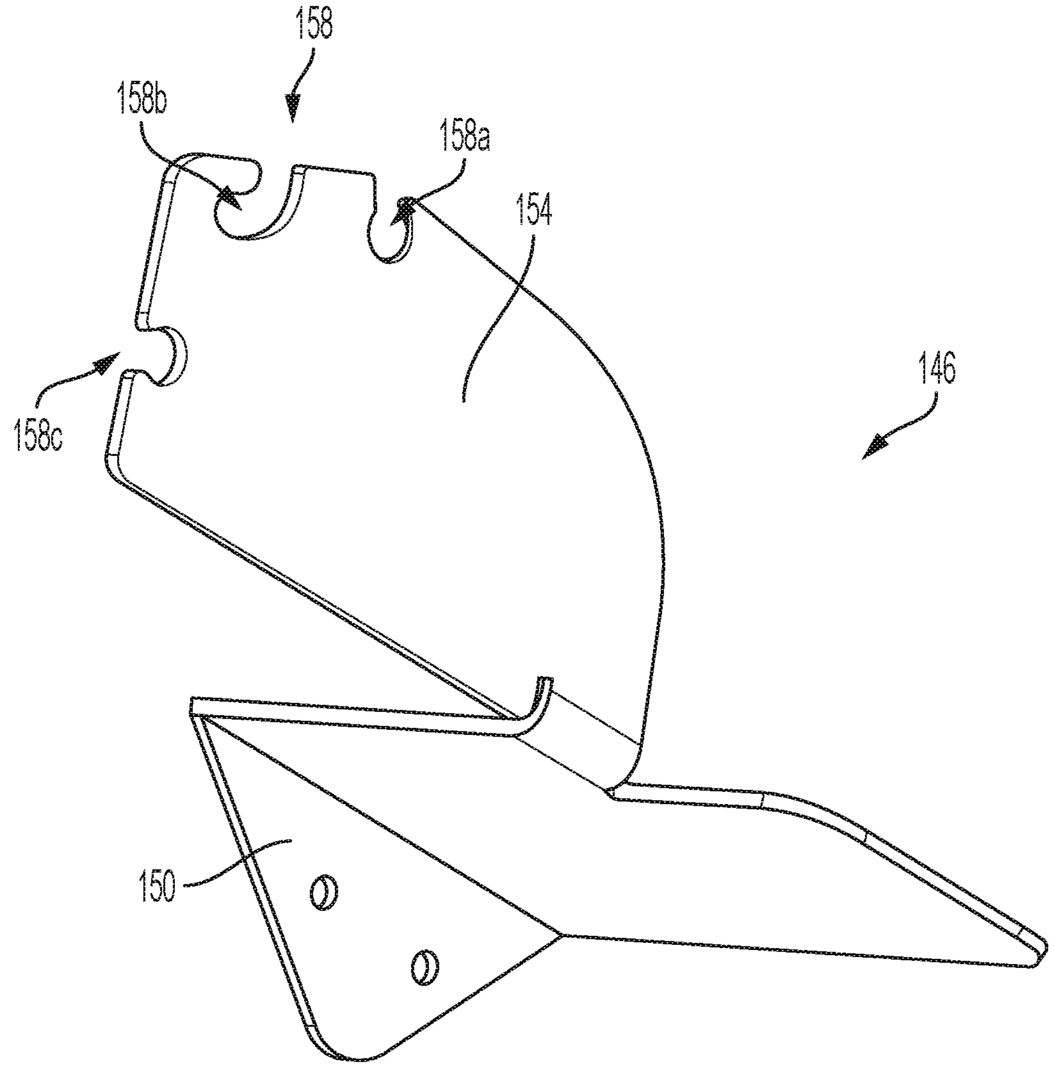
FIG. 10 is a perspective view of a storage mount bracket of the table saw of FIG. 1.

As illustrated in FIGS. 4 and 10, the table saw 10 further includes a storage mount bracket 146 that is mounted to the dust shroud 62 within the frame 18 (FIG. 2). The storage mount bracket 146 includes a flange portion 150 and a blade guard mounting portion 154. The flange portion 150 is fastened to the dust shroud 62 such that the storage mount bracket 146 moves with the dust shroud 62, for example, when a user adjusts a bevel angle of the saw blade 44 with the cutting depth/bevel angle adjustment mechanism 34.

With reference to FIGS. 5 and 10, the blade guard mounting portion 154 of the storage mount bracket 146 includes a second mating interface 158. The second mating interface 158 mimics the first mating interface 86 of the riving knife 78. Specifically, the second mating interface 158 includes a first slot 158*a*, a second slot 158*b*, and a third slot 158*c*. In the illustrated embodiment, the first slot 158*a* of the second mating interface 158 is identical to the first slot 86*a* of the first interface 86, the second slot 158*b* of the second mating interface 158 is identical to the second slot 86*b* of the first interface 86, and the third slot 158*c* of the second mating interface 158 is identical to the third slot 86*c* of the first interface 86. As such, the blade guard assembly 82 and/or the anti-kickback pawl assembly 102 may be mounted to the storage mount bracket 146 to place the blade guard assembly 82 and/or the anti-kickback pawl assembly 102 in the storage position, as illustrated in FIG. 11.

As described above, the storage mount bracket 146 is directly mounted to the dust shroud 62 of the saw unit 26 such that the storage mount bracket 146 moves with the dust shroud 62 as the bevel angle of the saw blade 44 (and therefore the remainder of the saw unit 26) is adjusted. Therefore, the blade guard assembly 82 and/or the anti-kickback pawl assembly 102 may also move with the dust shroud 62 when the blade guard assembly 82 and/or the anti-kickback pawl assembly 102 are mounted to the storage mount bracket 146 in the storage position.

Returning reference to FIG. 2, the first mating interface 86 of the riving knife 78 defines a first plane A1 that extends in a vertical direction P1 that is oriented perpendicular to the table 22. The second mating interface 158 of the storage mount bracket 146 defines a second plane A2 that extends in the vertical direction P1. The second plane A2 is parallel to the first plane A1. When the bevel angle of the saw unit 26 is adjusted, the riving knife 78 and the storage mount bracket 146 are equally adjusted such that the first plane A1 and the second plane A2 remain parallel at an angle relative to the vertical direction P1. Regardless to what bevel angle the saw unit 26 is adjusted, the crank 76 and the gear train 77 remain positioned between the first plane A1 and the second plane A2.

Figure 12:
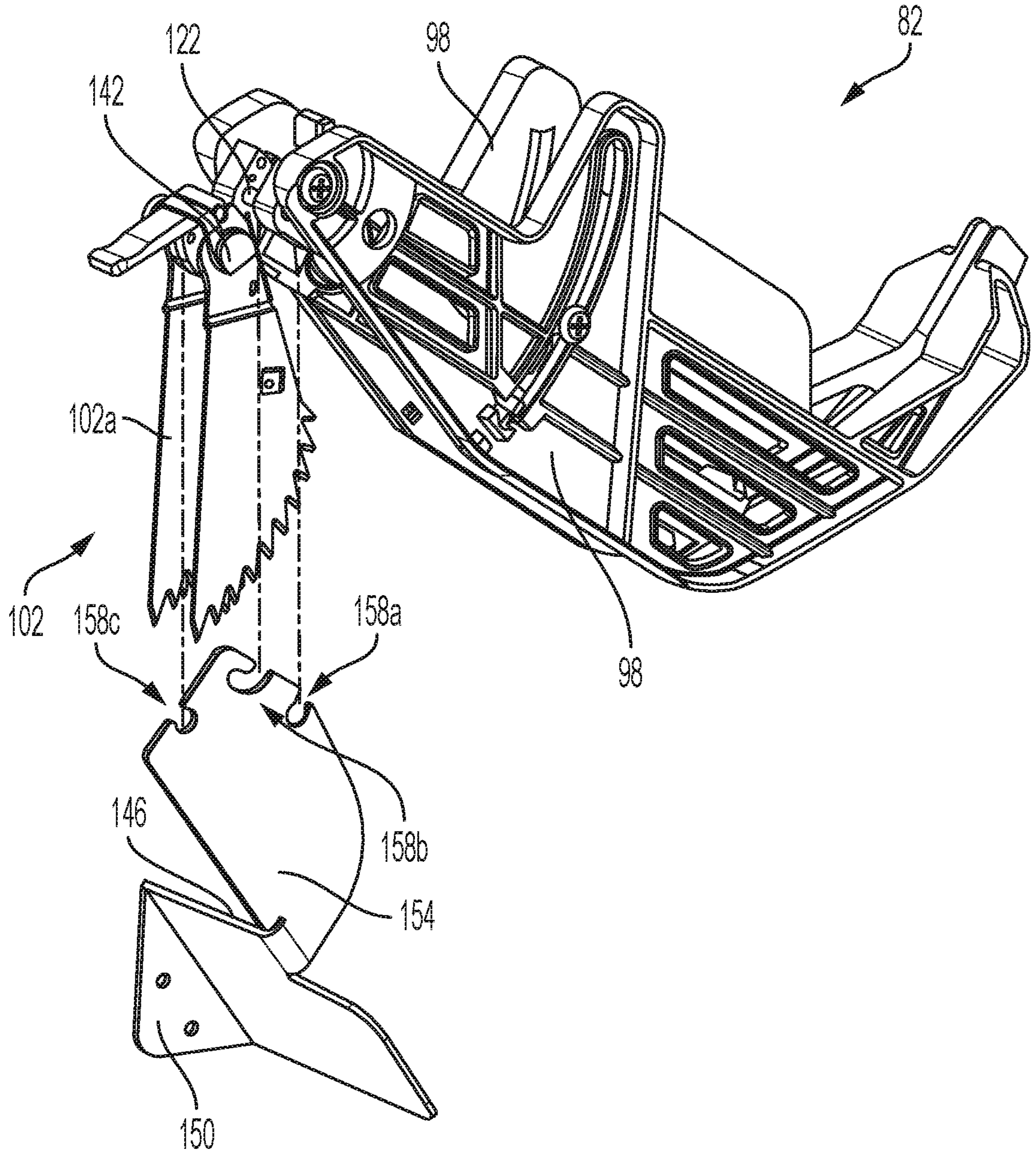
FIG. 12 is a perspective view of the blade guard assembly of FIG. 6 and the storage mount bracket of FIG. 10, illustrating the blade guard assembly removed from the storage mount bracket.

With reference to FIGS. 4 and 12, to move the blade guard assembly 82 from the operating position, in which the blade guard assembly 82 is mounted to the riving knife 78, to the storage position, in which the blade guard assembly 82 is mounted to the storage mount bracket 146, a user may lift the upper blade guard 94 away from the table 22 (FIG. 2) such that the first pin 118 (FIG. 7B) is removed from the first slot 86*a* (FIG. 5). With the first pin 118 (FIG. 7B) removed, the upper blade guard 94 may be pulled such that the second pin 122 slides along the second slot 86*b* (FIG. 5) towards the user interface 38 of FIG. 1. The upper blade guard 94 may then be further lifted away from the table 22 to slide the second pin 122 along the 90-degree curve of the second slot 86*b* (FIG. 5) and remove the blade guard assembly 82 from the riving knife 78. The second pin 122 may then be inserted along a 90-degree curve of the second slot 158*b* on the storage mount bracket 146. With the second pin 122 positioned in the second slot 158*b*, the upper blade guard 94 may be lowered such that first pin 118 (FIG. 7B) is inserted into the first slot 158*a* on the storage mount bracket 146 to place the blade guard assembly 82 in the storage position. To move the anti-kickback pawl assembly 102 from the operating position to the storage position, a user may engage, or actuate, the quick-release mechanism 142 (e.g., by pressing a button or another similar actuation device on the quick release mechanism 142) to release the spring bias acting on the quick-release mechanism 142. With the spring bias released, the anti-kickback pawl assembly 102 may be removed from the third slot 86*c* (FIG. 5) on the riving knife 78 and inserted into the third slot 158*c* on the storage mount bracket 146. Once the anti-kickback pawl assembly 102 has been placed in the third slot 158*c*, the user may then disengage the quick-release mechanism 142 (e.g., by releasing a button or another similar actuation device on the quick release mechanism 142) to secure the anti-kickback pawl assembly 102 in the storage position on the storage mount bracket 146. In the illustrated embodiment, the blade guard assembly 82 and the anti-kickback assembly 102 may be moved between the operating position and the storage position independently from each other.

Therefore, the storage mount bracket 146 advantageously enables ease of transport of the blade guard assembly 82 and/or the anti-kickback pawl assembly 102 between the operating position and the storage position. In other words, the storage mount bracket 146 enables a user to move the blade guard assembly 82 and/or the anti-kickback pawl assembly 102 between the operating position and the storage position without the use of additional components to secure or unsecure the blade guard assembly 82 and/or the anti-kickback pawl assembly 102 to either the riving knife 78 or the storage mount bracket 146. Accordingly, the storage mount bracket 146 provides a convenient location onboard the table saw 10 for storing the blade guard assembly 82 and/or the anti-kickback pawl assembly 102 when not in use.

Figure 13:
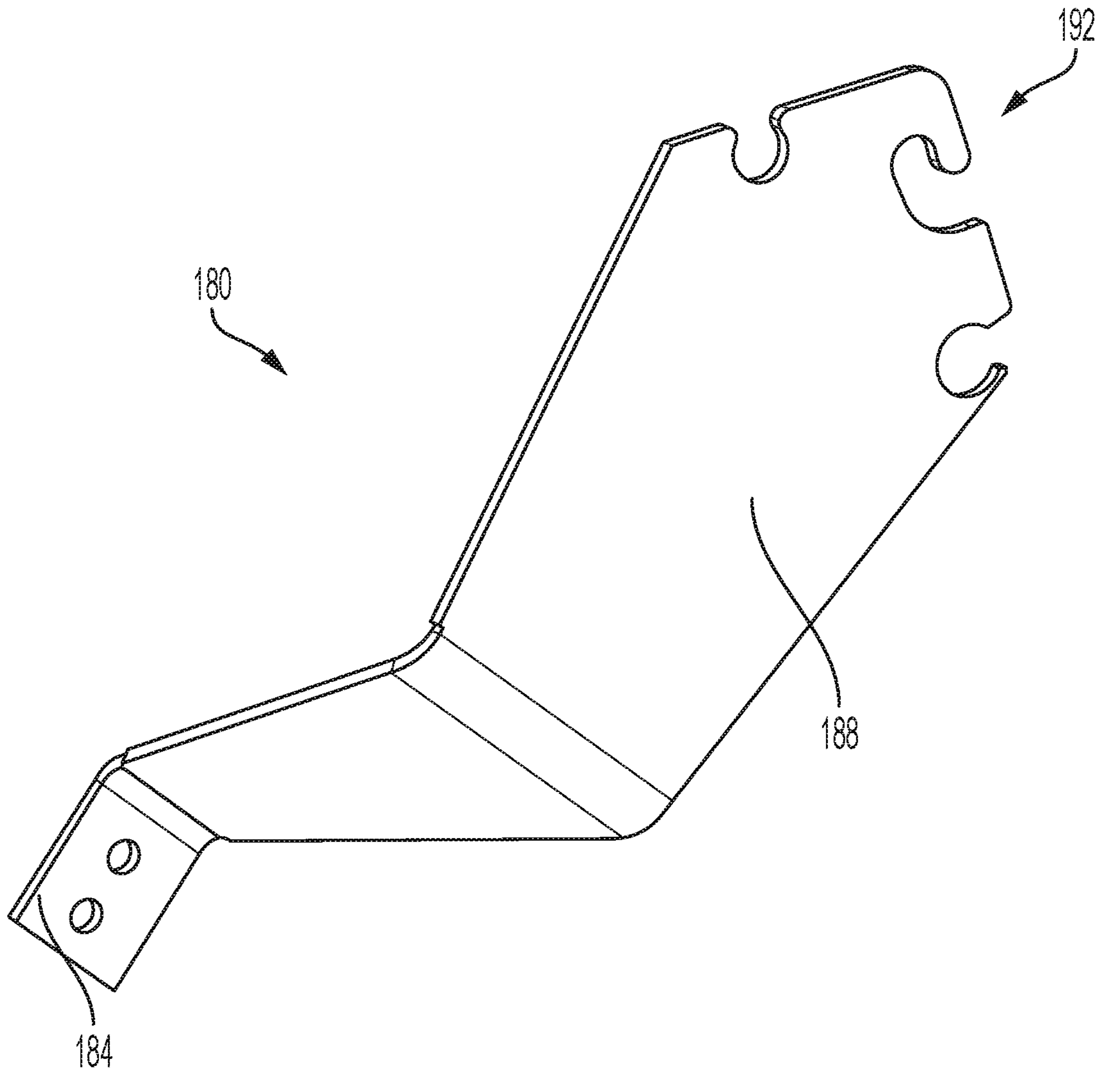
FIG. 13 is a perspective view of a storage mount bracket for use with the table saw of FIG. 1.

FIG. 13 illustrates a storage mount bracket 180 according to another embodiment of the disclosure. The storage mount bracket 180 is substantially similar to the storage mount bracket 146 of FIG. 10. As such, the storage mount bracket 180 includes a flange portion 184 and a blade guard mounting portion 188. The storage mount bracket 180 additionally includes a second mating interface 192 formed on, or disposed on, the blade guard mounting portion 188. The second mating interface 192 of FIG. 13 is substantially similar to the second mating interface 158 of FIG. 10 and may receive the blade guard assembly 82 and the anti-kickback pawl assembly 102 (FIG. 6) in a similar manner as the storage mount bracket 146 as described above with reference to FIG. 12.

The storage mount bracket 180 of FIG. 13 is reduced in size relative to the storage mount bracket 146 of FIG. 10. Specifically, each of the flange portion 184 and the blade guard mounting portion 188 may be smaller in weight, volume, and/or area than the flange portion 150 and the blade guard mounting portion 154, respectively, of FIG. 10. The reduction in size of the storage mount bracket 180 may advantageously reduce manufacturing costs of the storage mount bracket 180 and improve ease of transport for the table saw 10.

Although the disclosure has been described in detail with reference to certain preferred embodiments, variations and modifications exist within the scope and spirit of one or more independent aspects of the disclosure as described.

Various features and aspects of the disclosure are set forth in the following claims.

The invention claimed is:

1. A table saw comprising:
- a table;
- a saw unit including
  - a saw blade extendable through a slot in the table, and
  - a riving knife positioned behind the saw blade and having a first mating interface;
- a storage mount bracket having a second mating interface similar to the first mating interface; and
- a blade guard assembly attachable to the first mating interface of the riving knife to cover at least a portion of the saw blade, the blade guard assembly being additionally attachable with the second mating interface to attach the blade guard assembly to the storage mount bracket when the blade guard assembly is removed from the riving knife.

2. The table saw of claim 1, wherein the second mating interface is identical to the first mating interface.

3. The table saw of claim 1, wherein the saw unit is pivotable relative to the table to adjust a bevel angle of the saw blade, and wherein the storage mount bracket is coupled to the saw unit and moveable therewith when the bevel angle of the saw blade is adjusted.

4. The table saw of claim 1, wherein the storage mount bracket is positioned beneath the table, and wherein the blade guard assembly is positioned beneath the table when attached to the storage mount bracket.

5. The table saw of claim 4, wherein the second mating interface is identical to the first mating interface.

6. The table saw of claim 1, wherein the first mating interface of the riving knife defines a first plane that extends in a vertical direction oriented perpendicular to the table, and wherein the second mating interface of the storage mount bracket defines a second plane that extends in the vertical direction and parallel to the first plane.

7. The table saw of claim 6, wherein the saw unit is pivotable relative to the table, and wherein the storage mount bracket is coupled to the saw unit such that the first plane and the second plane remain parallel as the saw unit is pivoted relative to the table.

8. The table saw of claim 1, further comprising an anti-kickback pawl assembly coupled to the first mating interface of the riving knife, the anti-kickback pawl assembly additionally compatible with the second mating interface to attach the anti-kickback pawl assembly to the storage mount bracket when the anti-kickback pawl assembly is removed from the riving knife.

9. The table saw of claim 8, wherein the blade guard assembly and the anti-kickback pawl assembly are independently mountable to each of the riving knife and the storage mount bracket.

10. The table saw of claim 1, wherein the first mating interface includes a first slot, a second slot, and a third slot, and wherein the blade guard assembly includes a pin that is configured to be toollessly inserted in and removed from at least one of the first slot, the second slot, and the third slot to couple the blade guard assembly to the riving knife.

11. The table saw of claim 10, further comprising an anti-kickback pawl assembly including a quick-release mechanism that is configured to be toollessly inserted in and removed from a different one of the first slot, the second slot, and the third slot than the blade guard assembly.

12. A table saw comprising:
- a table;
- a saw unit including
  - a saw blade extendable through a slot in the table, and
  - a riving knife positioned behind the saw blade, the saw unit being pivotable relative to the table to adjust a bevel angle of the saw blade;
- a storage mount bracket coupled to the saw unit and moveable therewith when the bevel angle of the saw blade is adjusted; and
- a blade guard assembly interchangeably coupled to the riving knife when in an operating position to cover at least a portion of the saw blade, and the storage mount bracket when in a storage position and detached from the riving knife.

13. The table saw of claim 12, wherein the storage mount bracket is positioned beneath the table, and wherein the blade guard assembly is positioned beneath the table when attached to the storage mount bracket.

14. The table saw of claim 12, further comprising an anti-kickback pawl assembly attachable to each of the riving knife and the storage mount bracket independent of the blade guard assembly, and wherein the anti-kickback pawl assembly is movable with the saw unit when coupled to either the riving knife or the storage mount bracket.

15. The table saw of claim 12, wherein the riving knife defines a first plane, wherein the storage mount bracket defines a second plane parallel to the first plane, and wherein the riving knife and the storage mount bracket are configured such that the first plane and the second plane remain parallel as the saw unit is pivoted relative to the table.

16. The table saw of claim 15, further comprising a gear train and a crank that is actuatable to drive the gear train to move the saw unit relative to the table, and wherein the gear train is positioned between the first plane and the second plane.

17. A table saw comprising:
- a table;

a saw unit including a saw blade extendable through a slot in the table, the saw unit being pivotable relative to the table to adjust a bevel angle of the saw blade; and a blade guard assembly movable between a first position in which the blade guard assembly is removably coupled to the saw unit at a location above the table, and a second position in which the blade guard assembly is removably coupled to the saw unit at a location below the table for storage.

18. The table saw of claim 17, wherein the saw unit includes a riving knife positioned behind the saw blade, and wherein the blade guard assembly is coupled to the riving knife in the first position.

19. The table saw of claim 18, wherein the saw unit includes a dust shroud extending below the table, and wherein the table saw further comprises a storage mount bracket coupled to the dust shroud to which the blade guard assembly is attachable in the second position.

20. The table saw of claim 19, wherein the riving knife defines a first plane and the storage mount bracket defines a second plane, and wherein the first plane and the second plane are parallel.

* * * * *